US009710242B1

(12) United States Patent
Peermohammed et al.

(10) Patent No.: US 9,710,242 B1
(45) Date of Patent: Jul. 18, 2017

(54) METHOD SELECTION IN AN EXTERNAL LANGUAGE BASED ON OUTPUT PARAMETERS

(75) Inventors: Fazil Peermohammed, Holliston, MA (US); David A. Foti, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 758 days.

(21) Appl. No.: 12/895,129

(22) Filed: Sep. 30, 2010

Related U.S. Application Data

(63) Continuation-in-part of application No. 12/780,084, filed on May 14, 2010, now Pat. No. 8,037,481, which is a continuation of application No. 11/438,778, filed on May 22, 2006, now Pat. No. 7,725,904, which is a continuation of application No. 09/518,287, filed on Mar. 3, 2000, now Pat. No. 7,051,338.

(60) Provisional application No. 61/285,061, filed on Dec. 9, 2009.

(51) Int. Cl.
*G06F 9/45* (2006.01)

(52) U.S. Cl.
CPC . *G06F 8/41* (2013.01); *G06F 8/51* (2013.01)

(58) Field of Classification Search
CPC ... G06F 9/541; G06F 9/46; G06F 8/31; G06F 8/51; G06F 8/40; G06F 8/30; G06F 8/76; G06F 8/24; G06F 9/4448
USPC .......... 717/136–137; 719/328; 707/706, 723, 707/748–749
See application file for complete search history.

(56) References Cited

U.S. PATENT DOCUMENTS

| | | | | |
|---|---|---|---|---|
| 5,146,593 A | * | 9/1992 | Brandle et al. | 719/328 |
| 5,341,478 A | * | 8/1994 | Travis et al. | 709/203 |
| 5,841,947 A | * | 11/1998 | Nordin | G06N 3/004 706/13 |
| 5,907,707 A | * | 5/1999 | Ramalingam | G06F 9/443 712/E9.084 |
| 5,946,673 A | * | 8/1999 | Francone et al. | 706/13 |

(Continued)

FOREIGN PATENT DOCUMENTS

EP      0690 375     *   4/1995

OTHER PUBLICATIONS

Fonseca et al., "Generic ALgorithms for Multiobjective Optimization: Formulation, Discussion and Generalization", Jul. 1993. 8 pages.*

(Continued)

*Primary Examiner* — H S Sough
*Assistant Examiner* — Phuong N Hoang
(74) *Attorney, Agent, or Firm* — Nelson Mullins Riley & Scarborough LLP (57) ABSTRACT

A method and apparatus, including a computer program apparatus, which facilitate invoking methods defined within a second language system from a first language system. When a method is invoked from the first language system, the techniques automatically compare the output parameters of the first language system method with the number and data-types of parameters output by methods defined within the second language system. Based on this comparison, the invention selects a method that best matches the output signature of the invoked method. The invention, therefore, allows a user to easily invoke methods from external objects, such as C# objects, directly from the first language system.

23 Claims, 5 Drawing Sheets

(56) References Cited

U.S. PATENT DOCUMENTS

| | | | | |
|---|---|---|---|---|
| 5,946,674 | A * | 8/1999 | Nordin | G06N 3/126 706/13 |
| 6,192,418 | B1 * | 2/2001 | Hale et al. | 719/312 |
| 6,233,520 | B1 * | 5/2001 | Ito et al. | 701/431 |
| 7,051,338 | B1 * | 5/2006 | Foti et al. | 719/328 |
| 7,725,904 | B2 * | 5/2010 | Foti et al. | 719/319 |
| 8,037,481 | B2 * | 10/2011 | Foti et al. | 719/319 |

OTHER PUBLICATIONS

Gilmore, "Programming in Standard ML 97: A Tutorial Introduction", 1997, pp. 1-67.*

* cited by examiner

| 1st Language Data Type | 2nd Language Data Type | | | | | | | | | | |
|---|---|---|---|---|---|---|---|---|---|---|---|
| | Best Fit | | | | | | | | | | Worst Fit |
| | Boolean | Byte | SByte | Int16 | UInt16 | Int32 | UInt32 | Int64 | UInt64 | Single | Double | Object |
| logical | | | | | | | | | | | | |
| double | Double | Single | Decimal | Int64 | UInt64 | Int32 | UInt32 | Int16 | UInt16 | SByte | Byte | Object |
| single | Single | Double | Decimal | Object | | | | | | | | |
| int8 | SByte | Int16 | Int32 | Int64 | Single | Double | Object | | | | | |
| uint8 | Byte | UInt16 | UInt32 | UInt64 | Single | Double | Object | | | | | |
| int16 | Int16 | Int32 | UInt64 | Single | Single | Double | Object | | | | | |
| uint16 | UInt16 | UInt32 | UInt64 | Single | Double | Double | Object | | | | | |
| int32 | Int32 | UInt32 | Single | Single | Double | Double | Object | | | | | |
| uint32 | UInt32 | UInt64 | Single | Double | Double | Object | | | | | | |
| int64 | Int64 | Double | Object | Double | Object | | | | | | | |
| uint64 | UInt64 | Double | Object | | | | | | | | | |
| char | Char | String | Object | | | | | | | | | |
| function_handle | Object | | | | | | | | | | | |
| Object | Object | | | | | | | | | | | |

| 2nd Language Data Type | 1st Language Data Type (for scalar types) | 1st Language Data Type (for array types) |
|---|---|---|
| Int16 | int16 scalar | Int16 array |
| UInt16 | uint16 scalar | UInt16 array |
| Int32 | int32 scalar | Int32 array |
| UInt32 | uint32 scalar | UInt32 array |
| Int64 | int64 scalar | Int64 array |
| UInt64 | uint64 scalar | UInt64 array |
| Single | single scalar | Single array |
| Double | double scalar | Double array |
| Boolean | logical scalar | Boolean array |
| Byte | uint8 scalar | Byte array |
| Enum | enum | Enum array |
| Char | char | Char array |
| Decimal | Decimal | Decimal array |
| Object | Object | Object array |
| String | String | String array |
| Class name | Class name | Class Array |
| Struct name | Struct name | Struct array |

METHOD SELECTION IN AN EXTERNAL LANGUAGE BASED ON OUTPUT PARAMETERS

RELATED APPLICATIONS

This application is a continuation-in-part of, and claims benefit to, U.S. patent application Ser. No. 12/780,084, filed May 14, 2010, now U.S. Pat. No. 8,037,481, which is a continuation of, and claims benefit to, U.S. patent application Ser. No. 11/438,778, filed May 22, 2006, now U.S. Pat. No. 7,725,904, issued May 25, 2010, which is a continuation of, and claims benefit to, U.S. patent application Ser. No. 09/518,287, filed Mar. 3, 2000, now U.S. Pat. No. 7,051,338, issued May 23, 2006. This application further claims benefit to U.S. Provisional Patent Application No. 61/285,061, filed Dec. 9, 2009. The entire contents of the aforementioned applications are hereby incorporated by reference.

BACKGROUND

There are a number of different types of computing languages, language systems, and environments. For example, a technical computing environment may be used to design and test models of systems, such as block diagram models of systems. A technical computing environment may include textual languages which may be array-oriented, object-oriented, or support a combination of programming paradigms.

In modern computing language systems, it may be possible for applications to be built from code in multiple languages including multiple technical computing languages and multiple general-purpose languages.

In some situations, a user may wish to interface a first computing language, such as a specialized computing language, to a second language, such as the general purpose programming languages C#, Java, C++, C, .NET, etc. For example, a user may wish to invoke methods provided by a general purpose programming language from within a technical computing environment or technical computing language, in order to leverage the capabilities or methods of the general purpose language.

However, as a result of the differences between language systems, it may be difficult to interface some computing language systems to other language systems. For example, because some technical computing languages may not distinguish between scalars, vectors and matrices, it may be difficult to invoke methods that have the same name and are only distinguishable by the data types of their input and/or output parameters. In addition, it may be difficult to translate data from a format compatible with a first language system that represents data primarily as arrays (an "array-based language") to a format compatible with a different language system that does not natively represent data primarily as arrays.

Furthermore, language systems may support type polymorphism and/or operator overloading. As a result, multiple invocable methods having the same name may be defined in each language system. Each method may be called using the same name, but a different method will be called based on the number and type of inputs and/or outputs provided by each method. If the language is dynamically typed (i.e., type checking is performed at run-time), the particular version of the method that is called may not be known until the method is invoked using specific inputs. Thus, if a user invokes a method in a first language system, it may not be clear which method in a second language system corresponds to the invoked first language system method.

SUMMARY

In one embodiment, a computer-implemented method is provided for choosing, based on a method call in a first language system, a corresponding method in a second language system. The first language system may be a language system of a technical computing environment, such as the MATLAB® programming environment. In addition, the first language system may support multiple output arguments and/or may be dynamically typed. The second language system may be a general purpose object-oriented language system, such as one or a combination of Java, Javascript, C++, C#, or .NET. Accordingly, the second language system may support object-oriented constructs. In some embodiments, the first and/or second language system may be explicitly typed so that the type of each variable is explicitly declared. The first and/or second language system may each support combinations of multiple different languages.

A method call may be provided in the first language system. A signature of the first language system method call may be received and analyzed. The analyzing may determine zero or more input parameters, and one or more output parameters, of the first language system method call.

A second language system method may be selected based on the zero or more input parameters and the one or more output parameters of the first language system method call. The second language system method may be selected based on a comparison of the number and/or type of output parameters in the second language system method to the number and/or type of output parameters in the first language system method call.

To select the second language system method, an output signature of the first language system method call may be determined. The output signature of the first language system method call may include an indication of the number of output parameters of the first language system method call. The output signature of the first language system method call may be compared to an output signature of the second language system method. The output signature of the second language system method may include an indication of the number of output parameters of the second language system method. A fitness of the output signature of the second language system method to the output signature of the first language system method may be determined, and the second language system method may be selected based on the determined fitness.

If the second language system method includes reference parameters which can act as either input parameters or output parameters, the second language system method may be selected if an output parameter in the first language system method call matches the reference parameter in the second language system method's signature.

The first language system method call may be mapped to the selected second language system method, the mapping used when calling the second language system method in response to the first language system method call. In addition or alternatively, the second language system method may be called in response to the first language system method call.

In another embodiment, a computer program, such as a first language system, is provided. The program may have instructions suitable for causing a programmable processor to retrieve a list of one or more method signatures written in a second language system. The computer program may analyze the second language system method signatures, select one of the second language system method signatures that corresponds to the first language system method call; and invoke the corresponding method in the second language system.

In yet another embodiment, a computer system having a first language system and a second language system executing thereon may be provided. The second language system may include an interface for identifying second language system methods within the second language system. If the second language system provides one or more object-oriented languages, the second language system methods may be provided by one or more objects defined within the second language system. The first language system may include a calculation workspace, a command interpreter, and a signature selector. When the command interpreter encounters a reference to a method implemented by the second language system, the command interpreter may instruct the signature selector to access the interface of the second language system to retrieve a list of one or more signatures corresponding to methods defined within the second language system. The command interpreter may invoke one of the second language system methods.

The details of various embodiments are set forth in the accompanying drawings and the description below. Other features and advantages of the invention will become apparent from the description, the drawings, and the claims.

DETAILED DESCRIPTION

Exemplary embodiments facilitate invoking methods of objects defined within a second language system from a first language system. In particular, these embodiments allow methods defined in a second language, such as C#, to be invoked from a first language, such as a technical computing language and/or array-based language provided by a technical computing system. When a method is invoked from the first language system, the techniques automatically compare the number and type of output parameters of the first language system method call with the number and types of data output by methods defined within the second language system. Based on this comparison, a second language system method that best fits an output signature of the invoked first language system method is automatically selected. Alternatively, any suitable second language system method may be selected once the second language system method is identified without prioritizing or ranking the methods.

With the exemplary embodiments described herein, a user may directly and easily invoke second language system methods from external objects, such as C# objects, within the first language system. In this way, the features and capabilities of an external language may be utilized from within the first language system. Accordingly, methods do not need to be redefined for each language, and the strengths of each language can be leveraged to perform a task.

Figure 1:
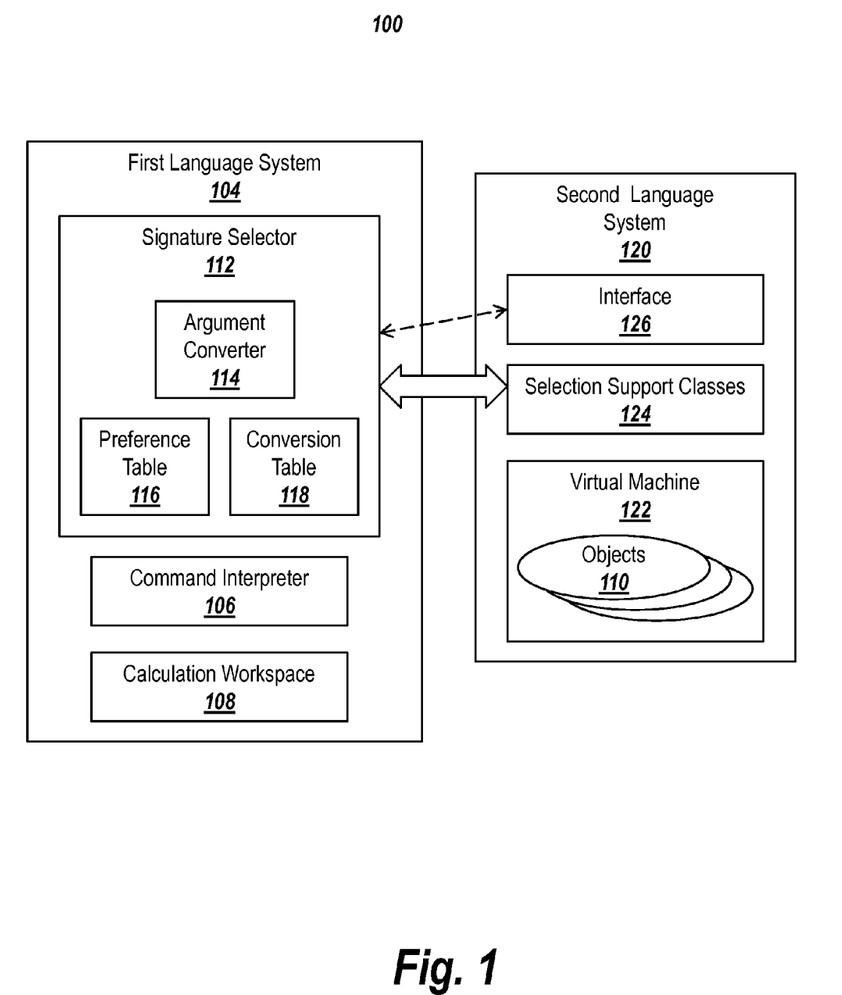
FIG. 1 is a block diagram illustrating a system in which a first language system invokes a method of an object defined within a second language system that is object-oriented.

The exemplary embodiments may be practiced using a system, such as the system 100 depicted in FIG. 1.

FIG. 1 illustrates a system 100 in which a first language system 104 invokes a method of an object in a second language system, such as C#. The first language system 104 may be provided by a mathematical tool. For example, the first language system may be a language system of a technical computing environment which performs a variety of numerical calculations and data analysis operations. Technical computing environments are typically designed to solve technical computing problems faster or more efficiently than traditional programming languages, such as C++ or C#. Technical computing environments may provide tools for signal and image processing, communications, control design, test and measurement, financial modeling and analysis, computational biology, and more.

The first language system 104 may be "array-based." In an array-based language system, most data types are represented as arrays of at least two dimensions. Further, an array-based language system may not distinguish between scalars, vectors, and matrices. One example of an array-based language system is the language system of the MATLAB technical computing environment. In some embodiments, the first language system 104 may be at least a partially dynamically typed language system.

The first language system 104 may support multiple output arguments. For example, a function may be represented as an equation having a left-hand side (LHS) and a right-hand side (RHS), with the inputs on the right hand side and the outputs on the left hand side. One example of such an equation is:

$$f(a,b,c)=g(d,e)$$

The first language system 104 may be provided in an interpreted environment that supports a high-level programming language. The high-level programming language may provide a variety of operators and programming commands. As the user enters instructions, a command interpreter 106 interactively interprets and executes each instruction. A calculation workspace 108 provides a storage area for variables, input data, and resultant data. The user can, for example, define a square matrix within the calculation workspace 108 using a single command.

The first language system 104 may invoke methods of one or more objects 110 in a second language system 120. The objects 110 may be one or more entities that can be manipulated by the commands of a programming language. The objects 110 may also be modules of computer code that specify the data types of a data structure, and also the kinds of operations (or "methods") that can be applied to the data structure. In an object-oriented language system, an object 110 may be a particular instance of a class. Accordingly, each object 110 may have a corresponding "class" that may be thought of as a prototype that defines the data structures and methods common to all objects of a certain kind. Objects 110 are created at run-time in accordance with their class definition. Thus, each object 110 is a unique instance, referred to as an instantiation, of its corresponding class.

Within a class in an object-oriented language, each method having the same name must have a different number of inputs, or one or more inputs must differ in data type. Each method has a "signature", which is a unique representation of the method's name and the number and type of each input and output parameter of the method. The method signature is used to distinguish between methods having the same name.

The second language system 120 may be object-oriented. For example, the second language system 120 may be a system that supports object-oriented constructs. Some well-known examples of object-oriented languages include .NET, C#, Java, Javascript, or C++. The second language system may include one of, or a combination of, these languages. In some embodiments, the second language system may be capable of supplying or accessing class libraries.

Either or both of the first and second language system 120 may provide a virtual machine 122, which provides a self-contained operating environment that is machine independent. The first and second languages may use the same or different virtual machines. The languages may execute within the virtual machine 122 regardless of the underlying operating system or hardware and represent any class that the virtual machine 122 can see within its scope of execution.

The techniques described herein allow a user to easily invoke methods of the objects 110 from the first language system 104. This allows the user to exploit the rich functionality offered by the second language system 120. For example, the user can invoke the objects 110 in order to quickly design a graphical user interface (GUI). In addition, the user can use certain objects 110, such as timers and events, within the calculation workspace 108. For example, if the objects 110 are .NET objects, the user can define and access the objects 110 from within the calculation workspace 108 as follows:

str=SystemString('Hello World');
imFilter.setPixels(5,5,100,100,cm,X,0,100);

The command interpreter 106 invokes a signature selector 112 that automatically determines the appropriate signature of the requested method for invocation. When the user invokes a method provided by one of the objects 110 from within the first language system 104, the command interpreter 106 passes the signature selector 112 a name of the invoked method and any input parameters to pass to the method in the second language system 120. Because the input parameters are defined in native data types supported by the first language system 104, the parameters are often in the form of an array having any number of dimensions. As described in detail below, the signature selector 112 automatically selects a method from the second language system 120 that is able to receive the data from the array inputs and/or to return data as represented by the outputs of the first language system method call.

More specifically, the signature selector 112 may use a set of classes within the second language system 120, referred to herein as selection support classes 124, to interrogate the second language system 120. The signature selector 112 passes the selection support classes 124 a method name and the name of the method's corresponding class. Based on the class name and method name, the selection support classes 124 determine a set of one or more matching method signatures available within the second language system 120. In order to communicate with the selection support classes 124, the signature selector 112 may use an interface 126, which is a programming interface, or API, that allows programs written in one language to invoke methods in another language based on a method signature. For example, the Java native interface (JNI) allows method calls in C or C++ to invoke Java methods based on a method signature. For another example, the C++/CLI language allows C++ code to introspect and interact with methods and objects defined in any .NET language.

The signature selector 112 determines and returns the signature of a method available within the second language system 120 that fits or closely approximates the output signature of the invoked method. If no suitable methods are found, the signature selector 112 may return a null signature. The command interpreter 106 uses the selected signature 112 to directly invoke the corresponding object 110 and execute the desired second language system method.

It should be noted that the system depicted in FIG. 1 is exemplary only. One of ordinary skill in the art will recognize that numerous modifications are possible without departing from the scope of the invention. For example, although FIG. 1 depicts a first language system 104 comprising a number of components interfacing with a second language system 120 comprising a number of components, one of ordinary skill in the art will recognize that more or fewer components may be provided. Further, a language system similar to the first language system may interface with another language system similar to the first language system, or a language system similar to the second language system may interface with another language system similar to the second language system. For example, the techniques described herein may be used to interface a C# language system with a .NET language system, or to interface two mathematical tools or technical computing environments having components similar to the depicted first language system.

Further, although exemplary embodiments described herein refer to a first language system method and a second language system method, one of ordinary skill in the art will recognize that the language systems may interact with one or more intermediaries. For example, the second language system may register one or more second language system method signatures with intermediary or proxy, and the first language system may interact with the intermediary or proxy when a first language system method is invoked. When a second language system method signature that corresponds to the invoked first language system method is identified, the proxy or intermediary may interact with the second language system in order to invoke the second language system method corresponding to the identified second language system method signature.

Figure 2:
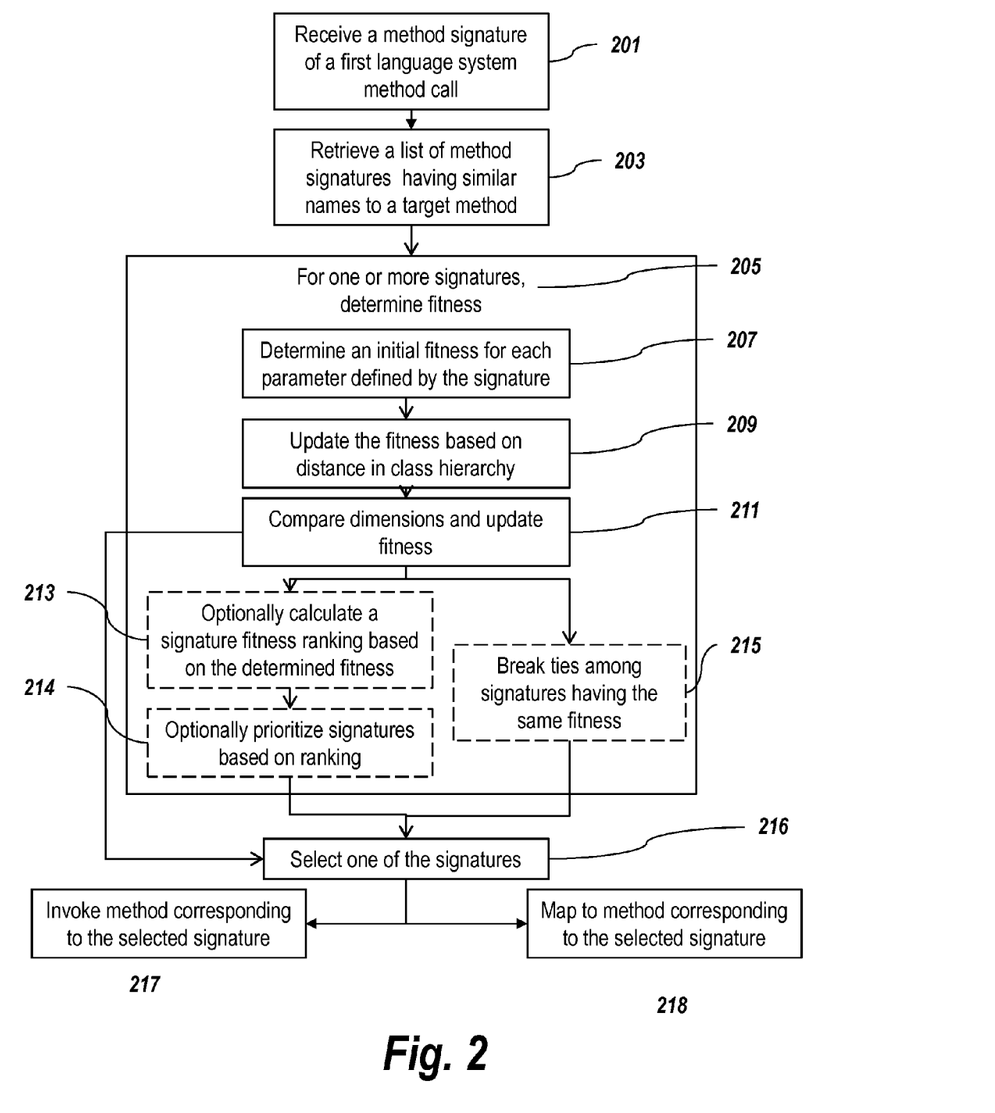
FIG. 2 is a flow chart illustrating steps that may be performed when the first language system invokes a method of the second language system.

FIG. 2 is a flow chart illustrating one embodiment of a process 200, suitable for implementation in a computer program application, in which a first language system, such as the first language system 104 (FIG. 1) invokes a method of a second language system 120.

When the user seeks to invoke a method provided by one of the objects of the second language system, the user may call the method from within the first language system. A signature of the first language system method call may be received or determined in the first language system. For example, the command interpreter 106 may invoke the signature selector 112 to automatically determine the appropriate signature of the requested first language system method.

As described above with respect to FIG. 1, the selection support classes 124 may interrogate the second language system 120 and compile a list of one or more second language system method signatures having names similar to the requested first language system method and having a matching class name (step 203).

The signature of the first language system method and/or the signatures of the second language system methods may be: one or more input signatures, which include an indication of the number and type of input parameters of the method; one or more output signatures, which includes an indication of the number and type of output parameters of the method; or one or more signatures describing a combination of input parameters and output parameters of the method.

The signature of the second language system method may be derived from a number of sources. For example, the second language system method signature may be predefined and stored so that the second language system method can be selected based on predefined signature. Alternatively, if the second language system method has been previously called, the system may take note of the input and/or output signature of the second language system method for future reference.

Next, the signature selector 112 may determine a fitness for some or all of the second language system method signatures of the list (step 205). The fitness indicates how well the number and data types of the input parameters and/or output parameters of each method fit the input parameters and/or output parameters passed from calculation workspace 108. The fitness may be a value, which may be calculated based on the similarity between the invoked method and the second language system signatures or which may initialized to a starting value and added to and/or subtracted from based on how well a particular second language system method signature fits the invoked first language system method. Exemplary techniques for determining a fitness are described in more detail below with respect to steps 207-215.

The signature selector 112 may analyze the signature of the first language system method call to determine zero or more input parameters and one or more output parameters of the first method call. The fitness may be determined by comparing the number of output parameters in the first language system method call to the number of output parameters in the second language system method; the type of output parameters in the outputs of the two methods; the number and types of input parameters in the inputs of the two methods; or a combination of these factors, among other things.

For example, the signature selector 112 may determine an output signature of the first language system method call. The output signature of the first language system method call may identify the number of the one or more output parameters of the first language system method call. Further, the signature selector 112 may determine an output signature of the second language system method. The output signature of the second language system method may identify the number of the output parameters of the second language system method. A high fitness may be assigned if the number of output parameters in the first language system method call matches the number of output parameters in the second language system method. A match may be identified based on the fitness determined by comparing the output signature of the second language system method to the output signature of the first language system method call.

The output signature of the second language system method may be determined based on the signature of the second language system method determined at step 203. For example, the output signature of the second language system method may be determined by identifying one or more output parameters in the signature of the second language system method. Alternatively, the output signature of the second language system method may be determined independently from the signature of the second language system method.

In determining the output signature of the first language system method call and/or the second language system method, it should be noted that some language systems support reference parameters, which may be used as either an input or an output. For example, in C++, a reference parameter in a method is designated using an ampersand ("&"). The signature selector 112 may further determine at least one reference parameter in the signature of the second language system method. The reference parameter may act as an output parameter and may comprise at least a part of the output signature of the second language system method. In calculating a fitness value, the signature selector 112 may match at least one input parameter from the zero or more input parameters of the first language system method to the at least one reference parameter in the signature of the second language system method.

Some languages, such as C#, support "out" parameters. An out parameter is similar to a reference parameter in that an out parameter may also cause a variable to be passed by reference; however, whereas a reference parameter must be initialized before calling a method that uses the reference parameter, an out parameter does not need to be initialized before use.

In some languages, the signature of a method may be represented as an equation having a left-hand side ("LHS") and a right-hand side ("RHS"). The LHS may represent the outputs of the method, while the RHS may represent the inputs to the method. A reference value, which may represent both an input or an output, may be mapped to both the LHS and the RHS in determining a method signature. An out parameter may be mapped to only the LHS of the equation in determining the method signature.

In order to calculate a signature's fitness, the signature selector 112 may generate a preference value for each data type specified by the signature by comparing each data type with the output parameters received from the workspace 108 (step 207). For example, the signature selector 112 may identify, for each parameter of the output signature of the first language system method call, a parameter type. The signature selector 112 may then determine a type capable of accepting an identified parameter in the output signature of the second language system method. In one embodiment, the signature selector 112 may determine a type into which the identified parameter type may be cast without a loss of information.

For each data type specified by the signature, the signature selector 112 may reference a preference table 116, which maps data types of the first language system 104 to acceptable data types of the second language system 120 ordered by preference.

Figure 3:
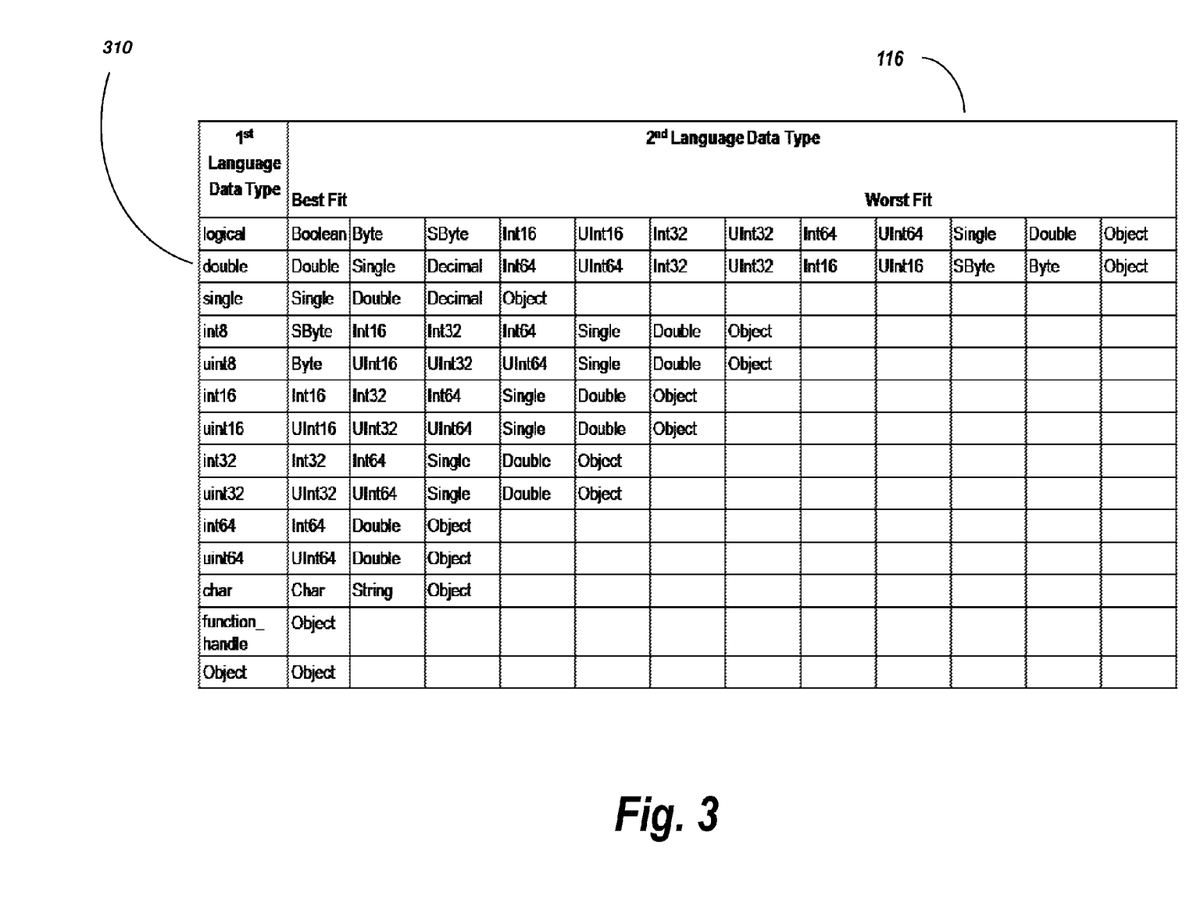
FIG. 3 illustrates one embodiment of a two-dimensional table that maps dynamically typed values in the first language system with static data types that are supported by the second language system, the data types being arranged in the table so that they are in order of preference as possible fits for dynamic types of values in the first language system. Specific names and types will vary in different language systems

FIG. 3 illustrates one embodiment of a two-dimensional preference table 116 for a .NET language system. Each row of the preference table 116 corresponds to a unique array type supported by the first language system 104. For example, row 310 corresponds to input parameters of type double and lists preferred data types for the second language system 120 as Double, Single, Decimal, Int64, UInt64, Int32, UInt32, Int16, UInt16, SByte, Byte, Object ordered from best fit to worst fit. Thus, for input parameters of type double, the signature selector 112 generates a preference value by determining the location of the corresponding signature data type within row 310. If the corresponding data type defined by the signature is not found within row 310 then the signature selector 112 rejects the signature from the list.

In an embodiment the signature selector 112 uses a preference table 116 that provides fitness information without regard to the dimensionality. In such embodiment the dimensions of parameters in the first language are compared against the dimensions of array parameters in the second language and this information is used to adjust the fitness computed from the table.

In calculating the preference value for an input data type or output data type defined by the signature, the signature selector 112 also considers whether the data type of the signature and the corresponding parameter received from calculation workspace 108 are both classes. If so, the signature selector 112 updates the preference value for that signature data type as a function of how many levels separate the two classes within a class hierarchy (step 209).

Next, the signature selector 112 may identify, for each parameter of the output signature of the first language system method call, a parameter dimensionality (step 211). The signature selector 112 may further determine a corresponding dimensionality in a corresponding parameter in the output signature of the second language system method. For example, the signature selector 112 compares the number of dimensions of the input array and/or the output array received from the calculation workspace 108 against the number of dimensions of the input and/or output data type defined by the current second language system method signature.

If the number of dimensions of the input array or output array is larger than the number of dimensions of the second language system data type, the signature is rejected because the input array or output array cannot fit into any parameter that can be passed to the second language system method. If the number of dimensions of the second language system data type is larger than that of the input or output array, the input or output array is promoted by adding dimensions of length 1. Thus, the signature selector may determine that a suitable fit may still exist when a dimensionality in the second language system method is higher than a parameter dimensionality of a parameter of the output signature of the first language system method call.

However, because the fit is not perfect, the corresponding preference value is adjusted in proportion to the degree of difference between the number of dimensions of the signature data type and the number of dimensions of the input or output array. In one implementation, the signature selector 112 does not count dimensions of length 1 when determining the number of dimensions. For example, a 5×1 array is considered to have a single dimension.

It should be noted that the signature selector 112 need not explicitly store the calculated preference value for each parameter of the signature. To the contrary, the signature selector 112 can calculate the fitness value for the signature while iterating over the data types defined by the signature.

After calculating a preference value for each data type specified by the second language system signature, the signature selector 112 may use the preference value for the second language system signature to determine the fitness of the second language system signature. The signature selector 112 may, for example, store a calculated fitness value for the second language system method signature.

After calculating fitnesses for each potential signature, the signature selector 112 may optionally rank or prioritize the signatures based on the fitnesses (step 213). In one implementation, the signature selector 112 initializes a fitness ranking, Fitness_Ranking, to a large number, such as 20, and updates the ranking for each parameter of the current method signature.

For example, consider the following method invoked from within the workspace 108:

f=obj.example_method(parameter1, parameter2);

Assume parameter1 of the method is a 1×1 array of double and parameter2 is a 15×1 array of chars. Consider a method signature defining a first data type decimal and a second data type array of char having two dimensions. The signature selector 112 subtracts two from Fitness_Ranking because, in the preference table 116, the data type decimal is third of the data types preferred for an input data type double (as noted above, the signature selector 112 may treat an array of doubles as the equivalent of a double for purposes of consulting the preference chart 116). Next, the signature selector 112 determines that the data type array of char is in the most preferred data type for an input data type of array of characters and, therefore, does not adjust Fitness_Ranking.

Because the parameters are not objects, the signature selector 112 does not adjust Fitness_Ranking based on differences in class level. Next, the signature selector 112 considers the dimensions and determines that the first data type of the signature, long, is a match dimensionally for a 1×1 array of doubles. Thus, the signature selector 112 does not update Fitness_Ranking. However, the two dimensional array of char is one dimension greater than the 15×1 array of characters, so signature selector 112 adjusts Fitness_Ranking by one, resulting in a final value for Fitness_Ranking of 17.

The signature selector 112 may select the signature having the highest ranking, unless all of the signatures have been rejected as being unsuitable. The signature selector 112 returns the selected signature to the command interpreter 106.

For example, in some embodiments, the signature selector 112 may determine at least two potential matching methods in the second language system that are potential matches for the first language system method call. The signature selector 112 may prioritize the at least two potential second language system matching methods relative to each other (step 214). The matches may be prioritized based at least in part on a fitness of each of the potential matching methods as a match for the first language system method call. For example, a higher priority may be assigned to a potential second language system method that has a better fitness as a match for the first language system method call. The potential match having the highest priority may be selected as the second language system method that corresponds to the first language system method.

Prioritizing at least two potential matching methods relative to each other may include prioritizing based on relative matches between input parameters of the first language system method call and input parameters of the at least two potential matching methods. Alternatively, prioritizing at least two potential matching methods relative to each other may include prioritizing based on relative matches between output parameters of the first language system method call and input or output parameters of the at least two potential matching methods. In some embodiments, prioritizing may be performed based on at least one or a combination of: number of the output parameters of the first language system method call, types of the output parameters of the first language system method call, and dimensionality of the output parameters of the first language system method call.

It should be noted that steps 213-214 are optional steps. A suitable signature may be selected without ranking or prioritizing the signatures, such as when a signature meets or exceeds a predetermined fitness threshold. In such a case, the search may be stopped and the signature may be selected as a match for the invoked method.

Whether or not the signatures are ranked and prioritized, it may be the case that two or more signatures are determined to be equally good fits for the invoked method. There are a number of ways to break ties among signatures having the same fitness (step 215). For example, if two method signatures have the same fitness, or if their fitness differs by less than a predetermined amount, an interface may be presented to a user to allow the user to choose which method signature in the second language system should be used.

Alternatively, the number of output parameters may be used as a tie-breaker if two possible matches have the same fitness value. For example, if a first language system method is called and two second language system method signatures have the same fitness calculated based on the number and type of input parameters, the number of output parameters may be used to break the tie and determine which second language system method signature best matches the first language system method call.

It should be noted that step 215 is an optional step. For example, if two signatures have the same fitness, the first signature to be identified may be used. Alternatively, if two or more signatures have the same fitness, one of the signatures may be chosen at random.

At step 216, one of the signatures is selected as a fit for the invoked method. The selected signature may be the signature with the highest priority, if a priority ranking was calculated at steps 213-214.

As an alternative to ranking or prioritizing the method signatures from the second language system, the signature selector 112 may simply accept a signature when a reasonably suitable signature is located. For example, once a signature passing a certain fitness threshold is identified, the identified signature may be used and the calculation of fitness rankings for the remaining signatures may be terminated.

If the second language system method signature includes one or more reference parameters, the second language system method may be selected if at least one output parameter of the first language system method call matches the one or more reference parameters.

Upon receiving a valid signature, the command interpreter 106 may invoke the corresponding second language system method within the second language system 120 (step 217). The second language system method may be called in response to a method call of the first language system method.

Invoking the second language system method may have two parts: (1) converting input parameters from the first language system 104 to input parameters defined by the signature, and (2) converting parameters returned by the method into suitable data types defined within the first language system 104.

In converting an input array to a data type defined by the signature, an argument converter 114 of the signature selector 112 generates a second language system variable according to the signature and copies data from the input array to newly created variable. The signature selector 112 returns the newly created variable to the command interpreter 106 for use when invoking the corresponding method.

Figure 4:
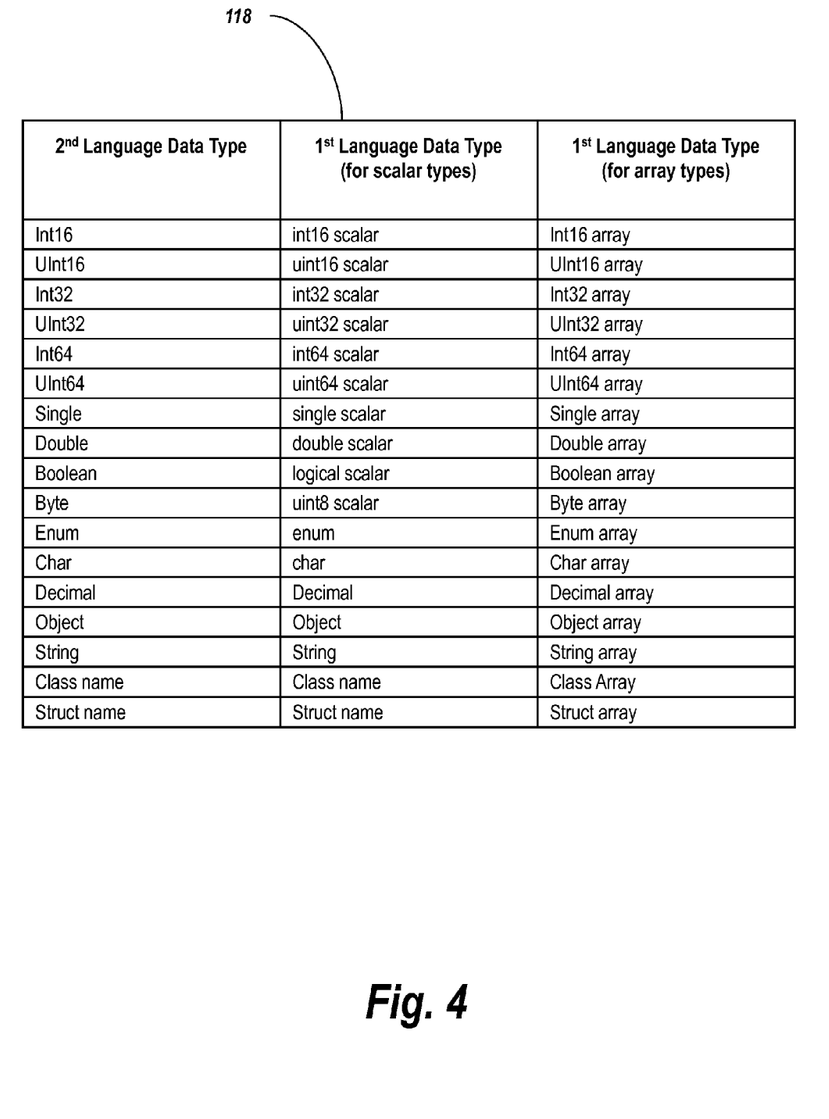
FIG. 4 illustrates one embodiment of a conversion table suitable for converting from data types in a second language system into values appropriate for use in a first language system which is dynamically typed. Specific names and types will vary in different language systems.

If the invoked method has a return parameter, the signature selector 112 examines the signature and determines the dimensions of the return parameter. The argument converter 114 of signature selector 112 then references a conversion table 118 and creates a return variable within the workspace 108 for holding the return data. FIG. 4 illustrates one embodiment of a conversion table 118 suitable for converting data types from a second language system 120, such as an object-oriented language system, to the first language system 104. In this particular example, the first language system 104 is an array-based language system. If the return parameter is scalar, then the return variable primarily defaults to a 1×1 array of type double precision floating point. If the return value is a rectangular multidimensional array, the signature selector 112 creates an array having the same number of dimensions as the return parameter and having the same data type. If, however, the return parameter is an array of arrays in which the inner arrays have different lengths, then the signature selector 112 creates an array of arrays because it cannot create a single, rectangular array. After creating the return variable in the workspace 108, the signature selector 112 copies data from the return parameters directly into the return variable and passes the return variable to the command interpreter 106.

It should be noted that FIGS. 3 and 4 are exemplary only. Specific names, data types, and preferences will vary, for example, in different languages.

If, at step 207, the signature selector 112 determined a type into which one or more parameter types may be cast without a loss of information as a part of determining the fitness of the second language system method, then at step 217 the identified parameter type may be cast into the type determined by the signature selector 112.

Alternatively or in conjunction with step 217, the first language system method call may be mapped to the selected second language system method (step 218). For example, the first language system method and the second language system method's signature may be stored in a table or database for future reference. The mapping may be used when calling the second language system method in response to the first language system method call.

Various embodiments have been described of a method and system that facilitates invoking methods of objects defined within a second language system from a second language system, such as a technical computing environment often used in mathematical tools. The invention can be implemented in digital electronic circuitry, or in computer hardware, firmware, software, or in combinations of them. An apparatus of the invention can be implemented in a computer program product tangibly embodied in a non-transitory machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable within an operating environment of a programmable system including at least one programmable processor (computer) coupled to receive data and instructions from, and to transmit data and instructions to, a data storage system, at least one input device, and at least one output device.

Figure 5:
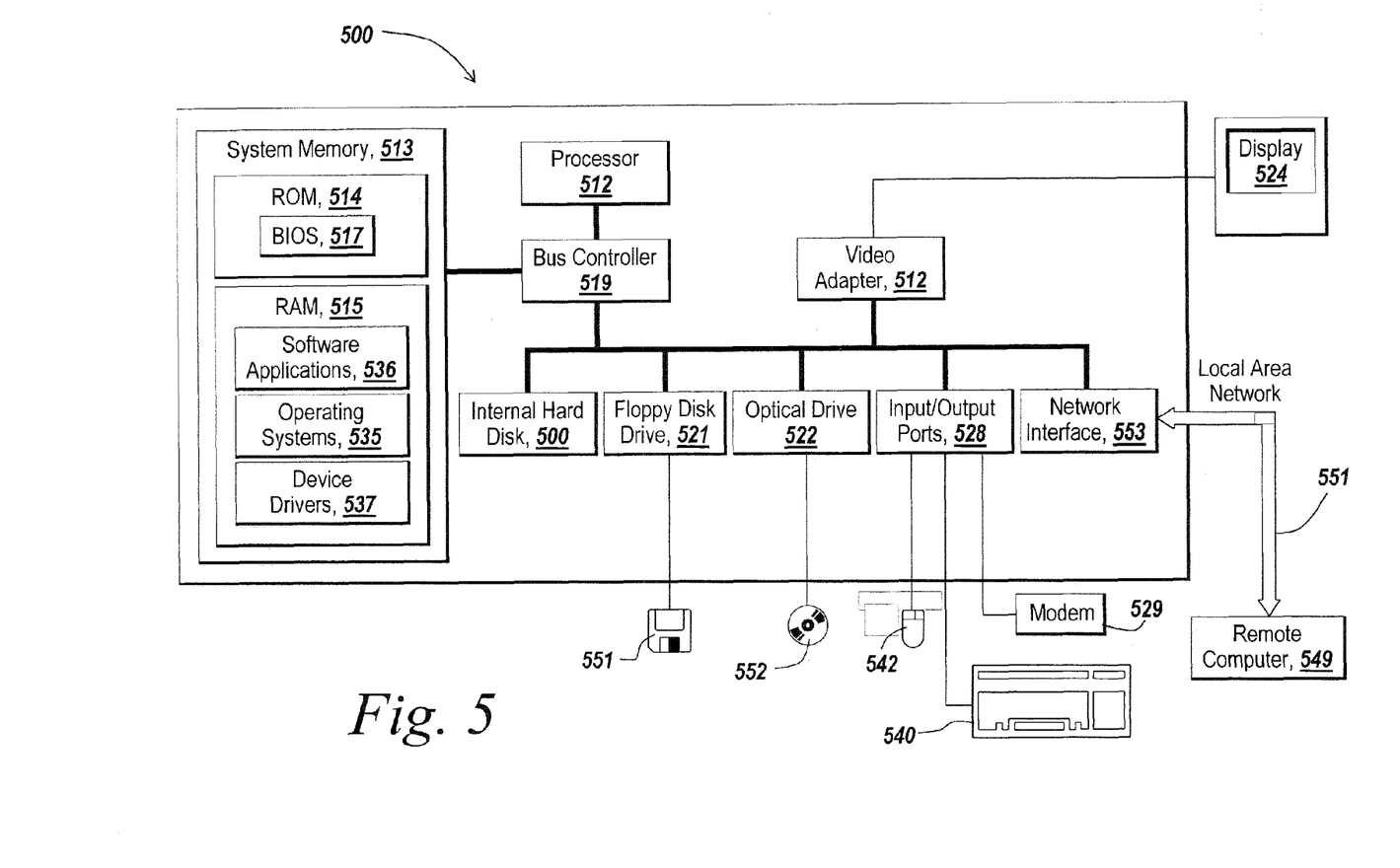
FIG. 5 is a block diagram illustrating a programmable processing system suitable for practicing exemplary embodiments.

An example of one such type of computer is shown in FIG. 5, which shows a block diagram of a programmable processing system (system) 500 suitable for implementing or performing the apparatus or methods of the invention. As shown in FIG. 5, the system 500 includes one or more processors 512. The processors 512 may include one or multiple cores. If multiple processors or multiple cores are provided, the first language system may be provided by a first processor or first core and the second language system may be provided by a second processor or second core.

It should be understood that the invention can be implemented on computers based upon different types of microprocessors, such as Intel microprocessors, the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. The system 500 represents any server, personal computer, laptop or even a battery-powered, pocket-sized, mobile computer known as a hand-held PC or personal digital assistant (PDA).

The system 500 includes a system memory 513 (including read only memory (ROM) 514 and a random access memory (RAM) 515), which is connected to the processor 512 by a system data/address bus 516. The ROM 514 represents any device that is primarily read-only including electrically erasable programmable read-only memory (EEPROM), flash memory, etc. The RAM 515 represents any random access memory such as Synchronous Dynamic Random Access Memory.

Within the system 500, input/output bus 518 is connected to the data/address bus 516 via bus controller 519. In one embodiment, the input/output bus 518 is implemented as a standard Peripheral Component Interconnect (PCI) bus. The bus controller 519 examines all signals from the processor 512 to route the signals to the appropriate bus. Signals between the processor 512 and the system memory 513 are merely passed through the bus controller 519. However, signals from the processor 512 intended for devices other than system memory 513 are routed onto the input/output bus 518.

Various devices are connected to the input/output bus 518 including hard disk drive 520, a floppy drive 521 that is used to read floppy disk 551, and an optical drive 522, such as a CD-ROM drive that is used to read an optical disk 552. The video display 524 or other kind of display device is connected to the input/output bus 518 via a video adapter 525. Users enter commands and information into the system 500 by using a keyboard 540 and/or pointing device, such as a mouse 542, which are connected to bus 518 via input/output ports 528. Other types of pointing devices (not shown in FIG. 5) include track pads, track balls, joysticks, data gloves, head trackers, touch screens, and other devices suitable for positioning a cursor on the video display 524.

As shown in FIG. 5, the system 500 also includes a modem 529. Although illustrated in FIG. 5 as external to the system 500, those of ordinary skill in the art will quickly recognize that the modem 529 may also be internal to the system 500. The modem 529 is typically used to communicate over wide area networks (not shown), such as the global Internet. The modem 529 may be connected to a network using either a wired or wireless connection. The system 500 is coupled to remote computer 549 via a local area network 550.

Software applications 536 and data are typically stored via one of the memory storage devices, which may include the hard disk 520, the floppy disk 551, the CD-ROM 552 and are copied to the RAM 515 for execution. In one embodiment, however, software applications 536 are stored in the ROM 514 and are copied to the RAM 515 for execution or are executed directly from the ROM 514.

In general, the operating system 535 executes software applications 536 and carries out instructions issued by the user. For example, when the user wants to load a software application 536, the operating system 535 interprets the instruction and causes the processor 512 to load the software application 536 into the RAM 515 from either the hard disk 520 or the optical disk 552. Once one of the software applications 536 is loaded into the RAM 515, it can be used by the processor 512. In case of large software applications 536, the processor 512 loads various portions of program modules into the RAM 515 as needed.

The Basic Input/Output System (BIOS) 517 for the system 500 is stored in the ROM 514 and is loaded into the RAM 515 upon booting. Those skilled in the art will recognize that the BIOS 517 is a set of basic executable routines that have conventionally helped to transfer information between the computing resources within the system 500. The operating system 535 or other software applications 536 use these low-level service routines. In one embodiment, the system 500 includes a registry (not shown) that is a system database that holds configuration information for the system 500. For example, the Windows operating system by Microsoft Corporation of Redmond, Wash., maintains the registry in two hidden files, called USER.DAT and SYSTEM.DAT, located on a permanent storage device such as an internal disk.

The invention has been described in terms of particular embodiments. Other embodiments are within the scope of the following claims. For example, the steps of the invention can be performed in a different order and still achieve desirable results. This application is intended to cover any adaptation or variation of the present invention. It is intended that this invention be limited only by the claims and equivalents thereof.

The invention claimed is:

1. A computer-implemented method comprising:
 receiving a signature of a first language system method call,
  the first language system method call originating in a first language system, and
  the receiving performed by a computing device;
 analyzing the signature of the first language system method call, the analyzing performed by the computing device;
 determining:
  zero or more input parameters of the first language system method call, and
  one or more output parameters of the first language system method call, where:
   the determining is based on the analyzing,
   the determining is performed by the computing device, and
  an output signature of the first language system method call, wherein the output signature of the first language system method call comprises an indication of a number of the one or more output parameters of the first language system method call; and
 interacting with a second language system,
  the second language system including a plurality of method implementations, the second language system including a second language,
the second language system being distinct with respect to the first language system, and
the interacting performed by the computing device;
determining an output signature of a second language system method, wherein the output signature of the second language system method comprises an indication of a number of output parameters of the second language system method;
calculating fitness values for multiple ones of the plurality of method implementations, each fitness value indicating a fitness of a respective one of the plurality of method implementations relative to the first language system method call;
selecting a second language system method implementation from the plurality of method implementations,
the selecting based on the interacting, and
the selecting performed by the computing device, wherein the selecting is performed based on the calculated fitness values; and
wherein the selecting of the second language system method implementation comprises:
identifying a parameter type for each output parameter of the output signature of the first language system method call; and
for each identified parameter type, determining a type capable of accepting the identified parameter type in the output signature of the second language system method by determining a casting type into which the identified parameter type may be cast without a loss of information;
mapping the first language system method call to the selected second language system method, wherein the mapping comprises casting the identified parameter type into the determined casting type, the mapping used when calling the second language system method in response to the first language system method call.

2. The computer-implemented method of claim 1, further comprising:
calling the second language system method in response to the first language system method call.

3. The computer-implemented method of claim 1, wherein the second language system method is selected based on a definition of at least one second language system method signature.

4. The computer-implemented method of claim 1, wherein the second language system method is selected based on a method call of the second language system method.

5. The computer-implemented method of claim 1, wherein determining the output signature of the second language system method from the signature of the second language system method further comprises:
determining at least one reference parameter in the output signature of the second language system method, wherein the at least one reference parameter acts as an output parameter and comprises at least a part of the output signature of the second language system method.

6. The computer-implemented method of claim 5, wherein selecting the second language system method based on the zero or more input parameters of the first language system method call and the one or more output parameters of the first language system method call further comprises:
matching at least one output parameter from the one or more output parameters of the first language system method call to the at least one reference parameter in the output signature of the second language system method; and
selecting the second language system method when the at least one output parameter is matched to the at least one reference parameter.

7. The computer-implemented method of claim 5, wherein selecting the second language system method further comprises:
matching at least one input parameter from the zero or more input parameters of the first language system method call to the at least one reference parameter in the output signature of the second language system method; and
selecting the second language system method when the at least one input parameter is matched to the at least one reference parameter.

8. The computer-implemented method of claim 1, wherein determining the output signature of the second language system method from the output signature of the second language system method further comprises:
determining at least one output parameter in the output signature of the second language system method.

9. The computer-implemented method of claim 1, wherein the second language system is a system that supports object-oriented constructs or the first language system is at least a partially dynamically typed language system.

10. The computer-implemented method of claim 1, wherein selecting the second language system method further comprises:
examining the plurality of method implementations in the second language system;
determining at least two potential matching methods in the second language system from among the plurality of method implementations, the at least two potential matching methods being potential matches for the first language system method call;
prioritizing the at least two potential matching methods relative to each other, the at least two potential matching methods prioritized based at least in part on a fitness of each of the potential matching methods as a match for the first language system method call such that a potential matching method having a better fitness as a match for the first method call is assigned a higher priority; and
selecting the potential matching method having the highest priority as the second language system method.

11. The computer-implemented method of claim 10, wherein the prioritizing further comprises:
prioritizing based on relative matches between input parameters of the first language system method call and input parameters of the at least two potential matching methods.

12. The computer-implemented method of claim 10, wherein the prioritizing further comprises:
prioritizing based on relative matches between the output parameters of the first language system method call and input or output parameters of the at least two potential matching methods.

13. The computer-implemented method of claim 12, wherein the prioritizing further comprises:
prioritizing based on at least one or a combination of: a number of the output parameters of the first language system method call, types of the output parameters of the first language system method call, and a dimensionality of an output parameter of the first language system method call.

14. The computer-implemented method of claim 1, wherein the second language system supports object-oriented constructs.

15. The computer-implemented method of claim 14, wherein the second language system is at least one or a combination of: .NET, Java, Javascript, C#, or C++.

16. The computer-implemented method of claim 1, wherein the first language system is compatible with at least a subset of the MATLAB programming language.

17. The computer-implemented method of claim 1, wherein the first language system is at least a partially dynamically typed language system.

18. The computer-implemented method of claim 1, wherein the first language system is a system supporting multiple output arguments.

19. The computer-implemented method of claim 1, wherein the second language system is a system capable of supplying or accessing class libraries.

20. A computer-implemented method comprising:
receiving a signature of a first language system method call,
the first language system method call originating in a first language system, and
the receiving performed by a computing device;
analyzing the signature of the first language system method call, the analyzing performed by the computing device;
determining:
zero or more input parameters of the first language system method call, and
one or more output parameters of the first language system method call, where:
the determining is based on the analyzing,
the determining is performed by the computing device, and
an output signature of the first language system method call, wherein the output signature of the first language system method call comprises an indication of a number of the one or more output parameters of the first language system method call; and
interacting with a second language system,
the second language system including a plurality of method implementations,
the second language system including a second language,
the second language system being distinct with respect to the first language system, and
the interacting performed by the computing device;
determining an output signature of a second language system method, wherein the output signature of the second language system method comprises an indication of a number of output parameters of the second language system method;
calculating fitness values for multiple ones of the plurality of method implementations, each fitness value indicating a fitness of a respective one of the plurality of method implementations relative to the first language system method call;
selecting a second language system method implementation from the plurality of method implementations,
the selecting based on the interacting, and
the selecting performed by the computing device, wherein the selecting is performed based on the calculated fitness values;
the selecting comprises:
identifying, for each parameter of the output signature of the first language system method call, a parameter dimensionality; and
determining a corresponding dimensionality in a corresponding parameter in the output signature of the second language system method, comprising determining a dimensionality that is higher than the parameter dimensionality of the parameter of the output signature of the first language system method call.

21. A computer-readable non-transitory storage medium storing instructions, the instructions comprising:
one or more instructions that, when executed by a processor of a computer, cause the processor to:
receive a signature of a first language system method call, the first language system method call originating in a first language system;
analyze the signature of the first language system method call;
determine:
zero or more input parameters of the first language system method call,
one or more output parameters of the first language system method call,
an output signature of the first language system method call, wherein the output signature of the first language system method call comprises an indication of a number of the one or more output parameters of the first language system method call, and
an output signature of a second language system method, wherein the output signature of the second language system method comprises an indication of a number of output parameters of the second language system method;
calculate fitness values for multiple ones of the plurality of method implementations, each fitness value indicating a fitness of a respective one of the plurality of method implementations relative to the first language system call;
select the second language system method, wherein:
the second language system method:
is associated with a second language system distinct from the first language system, and
is selected from among a plurality of method implementations in the second language system, and
the selecting is performed based on the calculated fitness values;
wherein the selecting of the second language system method implementation comprises:
identifying a parameter type for each output parameter of the output signature of the first language system method call; and
for each identified parameter type determining a type capable of accepting the identified parameter type in the output signature of the second language system method by determining a casting type into which the identified parameter type may be cast without a loss of information;
map the first language system method call to the second language system method, wherein the mapping comprises casting the identified parameter type into the determined casting type, the mapping used when calling the second language system method in response to the first language system method call.

22. A system comprising:
a storage for storing instructions that, when executed by one or more processors, cause the one or more processors to choose, based on a method call in a first language system, a corresponding method in a second language system distinct from the first language system; and
a processor for
determining an output signature of the first language system method call, wherein the output signature of the first language system method call comprises an indication of a number of the one or more output parameters of the first language system method call;
receiving a signature of the first language system method call;
analyzing the signature of the first language system method call to determine:
zero or more input parameters of the first language system method call, and
one or more output parameters of the first language system method call;
determining an output signature of a second language system method, wherein the output signature of the second language system method comprises an indication of a number of output parameters of the second language system method;
calculating fitness values for multiple ones of the plurality of method implementations, each fitness value indicating a fitness of a respective one of the plurality of method implementations relative to the first language system method call;
selecting the second language system method, wherein:
the second language system method is selected from among a plurality of method implementations in the second language system, and
the selecting is performed based on the calculated fitness values;
the selecting comprises:
identifying, for each parameter of the output signature of the first language system method call, a parameter dimensionality; and
determining a corresponding dimensionality in a corresponding parameter in the output signature of the second language system method, comprising determining a dimensionality that is higher than the parameter dimensionality of the output signature of the first language system method call; and
mapping the first language system method call to the second language system method, the mapping used when calling the second language system method in response to the first language system method call.

23. A non-transitory computer readable storage medium storing instructions, the instructions comprising:
one or more instructions that, when executed by a processor of a computer, cause the processor to:
receive a signature of a first language system method call,
the first language system method call originating in a first language system, and
the receiving performed by a computing device;
analyze the signature of the first language system method call, the analyzing performed by the computing device;
determine:
zero or more input parameters of the first language system method call, and
one or more output parameters of the first language system method call, where:
the determining is based on the analyzing,
the determining is performed by the computing device, and
an output signature of the first language system method call, wherein the output signature of the first language system method call comprises an indication of a number of the one or more output parameters of the first language system method call; and
interact with a second language system,
the second language system including a plurality of method implementations,
the second language system including a second language,
the second language system being distinct with respect to the first language system, and
the interacting performed by the computing device;
determine an output signature of a second language system method, wherein the output signature of the second language system method comprises an indication of a number of output parameters of the second language system method,
calculate fitness values for multiple ones of the plurality of method implementations, each fitness value indicating a fitness of a respective one of the plurality of method implementations relative to the first language system method call;
select a second language system method implementation from the plurality of method implementations,
the selecting based on the interacting, and
the selecting performed by the computing device, wherein the selecting is performed based on the calculated fitness values;
the selecting comprises:
identifying, for each parameter of the output signature of the first language system method call, a parameter dimensionality; and
determining a corresponding dimensionality in a corresponding parameter in the output signature of the second language system method, comprising determining a dimensionality that is higher than the parameter dimensionality of the output signature of the first language system method call; and
determine a dimensionality that is higher than the parameter dimensionality of the parameter of the output signature of the first language system method call.

\* \* \* \* \*